US008751801B2

(12) United States Patent
Harris et al.

(10) Patent No.: US 8,751,801 B2
(45) Date of Patent: Jun. 10, 2014

(54) SYSTEM AND METHOD FOR AUTHENTICATING USERS USING TWO OR MORE FACTORS

(75) Inventors: William H Harris, Woodside, CA (US); Louis A Gasparini, San Mateo, CA (US)

(73) Assignee: EMC Corporation, Hopkinton, WA (US)

( * ) Notice: Subject to any disclaimer, the term of this patent is extended or adjusted under 35 U.S.C. 154(b) by 2368 days.

(21) Appl. No.: 11/112,938

(22) Filed: Apr. 22, 2005

(65) Prior Publication Data

US 2005/0268107 A1    Dec. 1, 2005

Related U.S. Application Data

(63) Continuation-in-part of application No. 11/050,549, filed on Feb. 3, 2005, now Pat. No. 7,730,321, and a continuation-in-part of application No. 10/435,322, filed on May 9, 2003, now Pat. No. 7,100,049.

(60) Provisional application No. 60/565,057, filed on Apr. 23, 2004, provisional application No. 60/565,692, filed on Apr. 26, 2004.

(51) Int. Cl.
| H04L 9/32 | (2006.01) |
|---|---|
| H04L 29/06 | (2006.01) |
| G06F 21/31 | (2013.01) |
| G06F 21/42 | (2013.01) |
| G06F 21/35 | (2013.01) |
| G06Q 20/40 | (2012.01) |
| G06Q 20/12 | (2012.01) |

(52) U.S. Cl.
CPC ............ *G06F 21/35* (2013.01); *H04L 63/0861* (2013.01); *G06F 21/31* (2013.01); *G06F 21/42* (2013.01); *G06Q 20/40145* (2013.01); *H04L 9/3231* (2013.01); *H04L 63/083* (2013.01); *G06Q 20/12* (2013.01); *H04L 63/0853* (2013.01); *H04L 63/18* (2013.01)
USPC .............................................. 713/168; 726/7

(58) Field of Classification Search
USPC ........................... 713/186, 201, 176; 382/125
See application file for complete search history.

(56) References Cited

U.S. PATENT DOCUMENTS 5,953,700 A * 9/1999 Kanevsky et al. ......... 704/270.1
6,161,139 A   12/2000 Win et al.
(Continued)

FOREIGN PATENT DOCUMENTS

| EP | 04760929 | 4/2007 |
|---|---|---|
| WO | 0118636 | 3/2001 |
| WO | 0163878 | 8/2001 |

OTHER PUBLICATIONS

Looi, M. ; Enhanced authentication services for Internet systems using mobilenetworks; Publication Date: 2001 vol. 6, on pp. 3468-3472 vol. 6.*

(Continued)

*Primary Examiner* — Philip Chea
*Assistant Examiner* — Monjour Rahim
(74) *Attorney, Agent, or Firm* — Ryan, Mason & Lewis, LLP

(57) ABSTRACT

A method for authenticating a user based on a plurality of authentication factors includes a step of receiving a first authentication factor from a first communication device of the user. The first authentication factor includes a password. The method includes a step of receiving a second authentication factor. The second authentication factor comprises at least one of at least one device identifier of the first communication device of the user and data transmitted to or received from a second communication device of the user. The method also includes a step of authenticating the user based on at least the received plurality of authentication factors.

20 Claims, 6 Drawing Sheets

(56) References Cited

U.S. PATENT DOCUMENTS

| | | |
|---|---|---|
| 6,389,542 B1 | 5/2002 | Flyntz |
| 6,401,125 B1 | 6/2002 | Makarios et al. |
| 6,632,248 B1 | 10/2003 | Isaac et al. |
| 7,353,396 B2* | 4/2008 | Micali et al. ............ 713/176 |
| 7,426,750 B2* | 9/2008 | Cooper et al. ............ 726/26 |
| 7,480,915 B2* | 1/2009 | Costa Requena et al. .... 719/311 |
| 2003/0051147 A1* | 3/2003 | Maeda et al. ............ 713/186 |
| 2003/0191949 A1* | 10/2003 | Odagawa ............ 713/186 |
| 2004/0017934 A1* | 1/2004 | Kocher ............ 382/125 |
| 2005/0050322 A1* | 3/2005 | Mizrah ............ 713/168 |
| 2005/0071673 A1* | 3/2005 | Saito ............ 713/201 |
| 2005/0209974 A1* | 9/2005 | Okunseinde et al. ............ 705/64 |

OTHER PUBLICATIONS

Written Opinion of the International Searching Authority, Oct. 5, 2006, 3 pages.

International Search Report, Oct. 5, 2006, 2 pages.

* cited by examiner

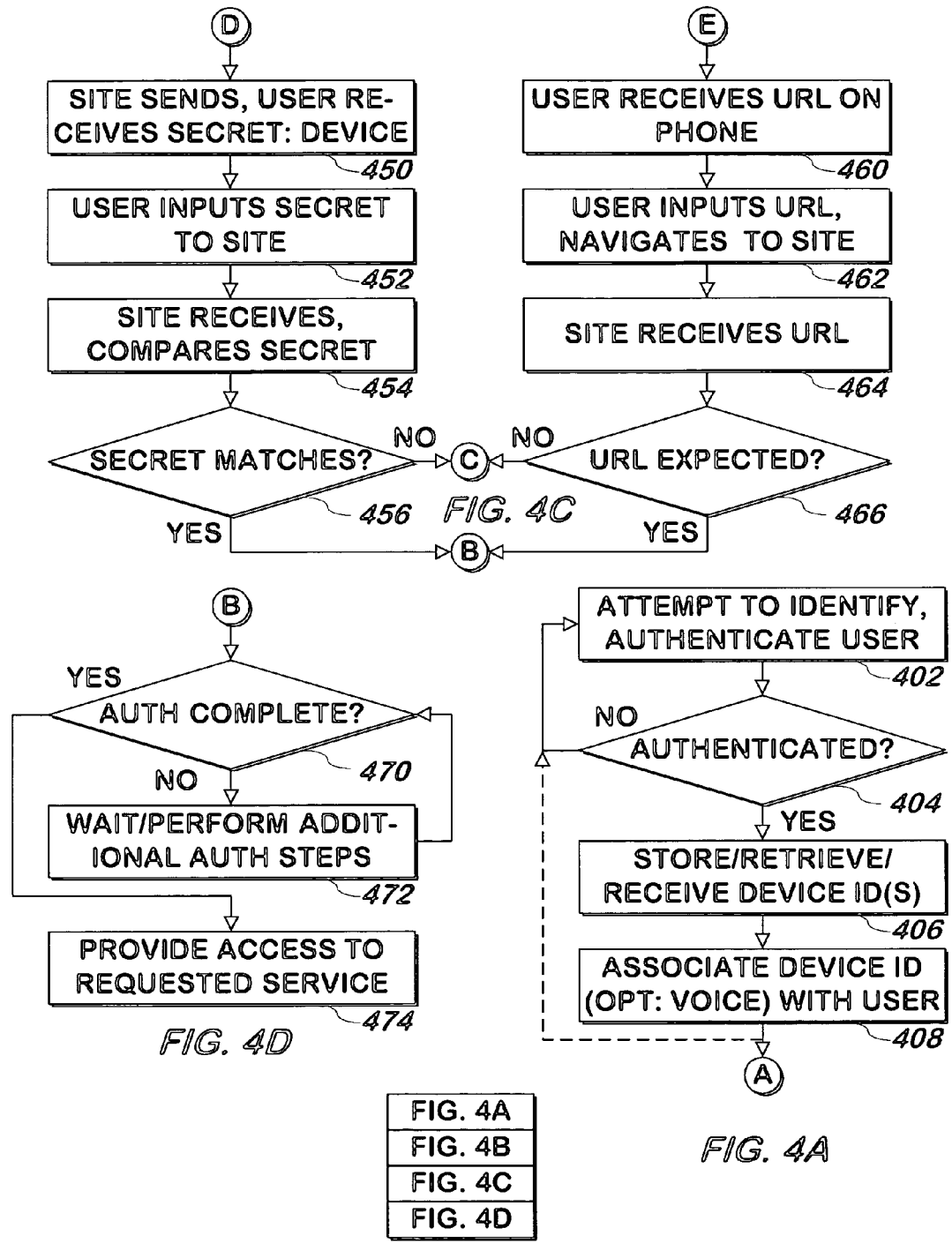

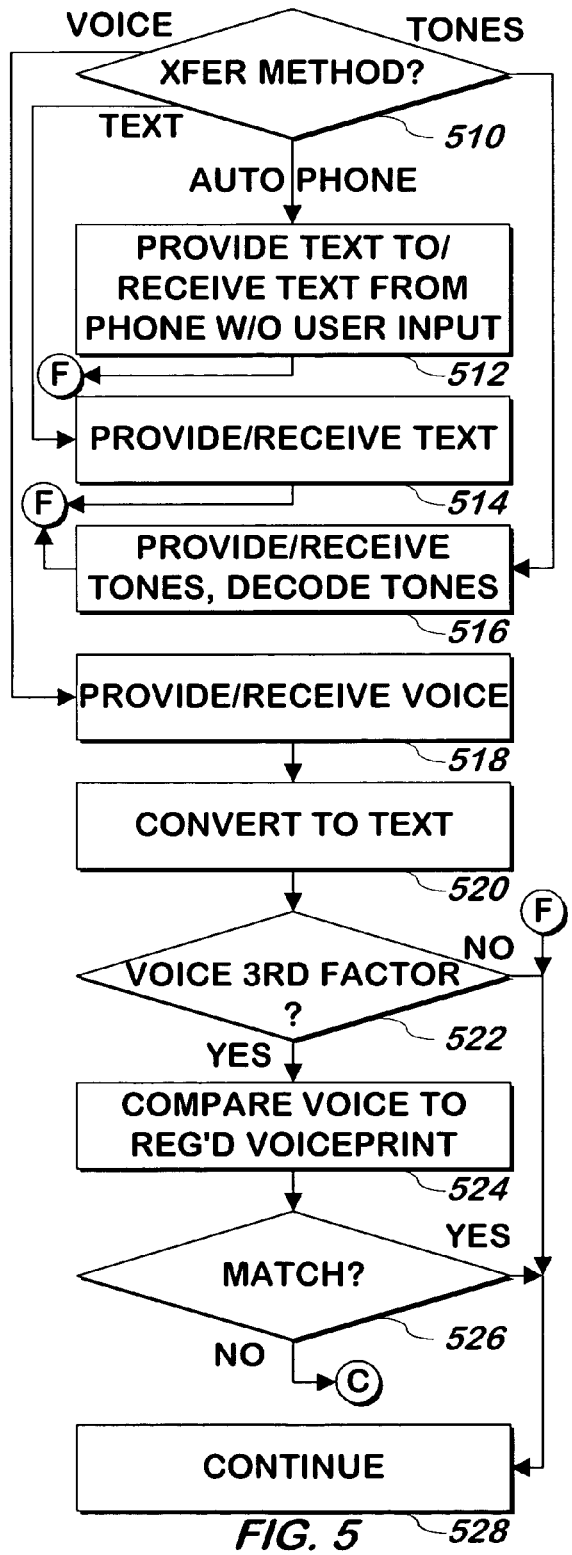
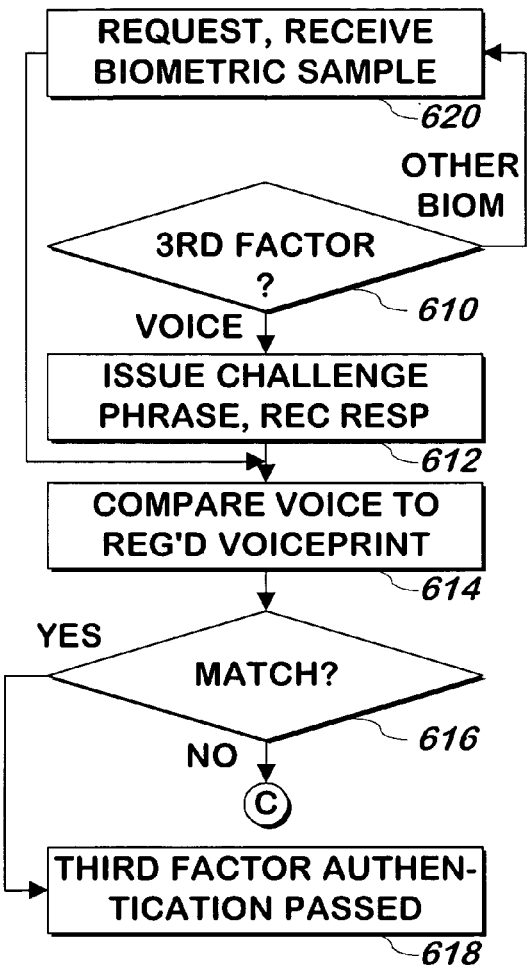
FIG. 5
FIG. 6

SYSTEM AND METHOD FOR AUTHENTICATING USERS USING TWO OR MORE FACTORS

RELATED APPLICATIONS

This application claims the benefit of U.S. Provisional Patent Application Ser. No. 60/565,057 entitled, "Method and Apparatus for Authenticating Users Using Two Factors" filed by William Harris and Louis Gasparini on Apr. 23, 2004, and U.S. Provisional Patent Application Ser. No. 60/565,692 entitled, "Method and Apparatus for Authenticating Users Using Two or More Factors" filed by William Harris and Louis Gasparini on Apr. 26, 2004 and is a continuation in part of application Ser. No. 11/050,549 entitled, "System and Method for Authentication of Users and Communications Received from Computer Systems" filed on Feb. 3, 2005 now U.S. Pat. No. 7,730,321 by Louis Gasparini and William Harris, and application Ser. No. 10/435,322 entitled, "Method and Apparatus for Authentication of Users and Web Sites" filed on May 9, 2003 now U.S. Pat. No. 7,100,049 by Louis Gasparini and Charles Gotlieb, each having the same assignee as this application and all are incorporated herein by reference in their entirety.

BACKGROUND OF THE INVENTION

Strong user authentication is achieved through the simultaneous presentation of multiple authentication factors, classically defined as: (1) something you know, (2) something you have, and (3) something you are. Most e-commerce today is based upon weak authentication utilizing only one factor—a password (something you know). Because of the increase of password-stealing exploits on the Internet, wider adoption of two-factor authentication is desirable.

However, two-factor authentication has been difficult to deploy, because it traditionally requires either (a) the distribution of new hardware to the user, such as a key fob or a smart card and reader, and/or (b) the installation of new software on the user's computer, such as a digital certificate. Therefore, the use of two-factor authentication has been limited to a relatively small number of very high-value relationships and transactions.

Individuals must present credentials to demonstrate that they are who they claim to be. These credentials are varied, and fall into three types, often referred to as authentication factors:

1. Information ("Something You Know")

Password, passphrase, PIN, zip code, phone number, Social Security number, account number, mother's maiden name, recent transactions, credit history, etc.

2. Object ("Something You Have")

Credit card, driver's license, ID card, passport, ticket, paper certificate, smart card, contactless card or key fob, dynamic password generator, phone, PDA, computer, peripheral, etc.

3. Person ("Something You Are")

There is only one instance of a person, but there are numerous ways to measure a person: photograph, signature, fingerprint, retinal scan, hand geometry, facial geometry, voiceprint, DNA analysis, etc.

Because individual credentials can be stolen or counterfeited, security can be increased by using multiple credentials. Multiple credentials of the same type offer less increased security than credentials of different types, because they can often be misappropriated at the same time in the same way. (For instance, if an attacker steals your wallet, he will get your driver's license and your credit cards.) But because credentials of different types must generally be stolen using different types of attack, the simultaneous use of different types of credentials—"multi-factor" authentication—increases the strength of an authentication. (For instance, an attacker might steal your wallet and get your ATM card, but would not have your PIN. Or an attacker might surreptitiously observe you entering your PIN, but would not have physical possession of your ATM card.)

In face-to-face interactions, credentials of all three types can be directly inspected. However, in remote interactions such as those done over the Internet, credentials which are objects or persons cannot be directly inspected—so their presence and authenticity should be verified in some other way. Typically, this is done by accessing some unique data stored on the object (such as the data encoded on a magnetic card) or by taking some measurement of the object or person (such as the fingerprint of a person). To prevent the fraudulent replay of such data, some systems employ dynamic data or a cryptographic challenge-response.

Systems which utilize objects or persons as authentication factors in remote electronic authentication generally require one or more of the following: (1) new software installed on the user's computer, (2) new hardware—such as a reader—attached to the computer, and/or (3) a hardware token, such as a smart card or a key fob, distributed to the user.

What is needed is a system and method that can perform two-or-more-factor authentication that can be deployed without requiring any software or hardware that the typical Internet user doesn't already possess.

SUMMARY OF INVENTION

A method for authenticating a user based on multiple authentication factors includes a step of receiving a first authentication factor from a first communication device of the user. The first authentication factor includes a password. The method further includes a step of receiving a second authentication factor. The second authentication factor may include, for example, a device identifier of the first communication device of the user, or data transmitted to or received from a second communication device of the user. The method also includes a step of authenticating the user based on the received authentication factors. The present invention, in an illustrative embodiment, advantageously facilitates deploying two-or-more-factor authentication in everyday consumer e-commerce, without requiring new hardware or software. This makes it practical for widespread use.

BRIEF DESCRIPTION OF THE DRAWINGS

FIG. 5 is a flowchart illustrating a method of identifying and implementing the transfer method to transfer information from a mobile device to a server and vice versa according to one embodiment of the present invention.

FIG. 6 is a flowchart illustrating a method of performing additional authentication steps that involve biometric authentication according to one embodiment of the present invention.

DETAILED DESCRIPTION OF A PREFERRED EMBODIMENT

Figure 1:
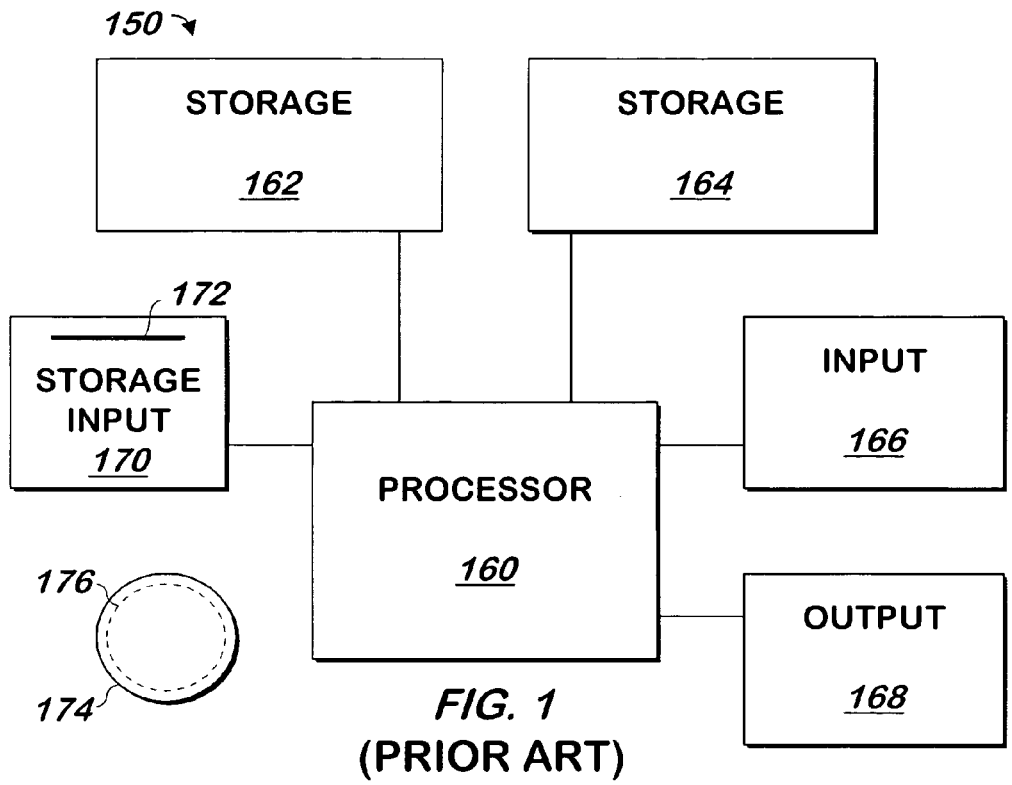
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

The present invention includes a system and method of two-factor or three-factor authentication that can be deployed without requiring any software or hardware that the typical Internet user doesn't already possess, using:

Device ID as a Credential—Placing an identifier on the user's computer (or deriving it from the computer) in order to authenticate the device and use it as a second factor of authentication.

Phone as a Hardware Token—Using a telephone or other commonly-held communication device (other than the user's computer) as a second factor of authentication.

These two methods can be used independently or in combination. For instance, an entity can choose to use only a device ID as a second-factor authentication for most interactions with a user. But it might choose to require the phone as a second-factor authentication for certain activities (such as registering a computer), permissions (such as writing data rather than viewing data), or transactions (such as high-dollar-value transactions).

In this way, the increased security of second-factor authentication using the device ID can be added to most user interactions, without changing the user experience at all. And even higher-security second-factor authentication using the phone can be added to a few critical interactions, without requiring any new software to be installed or any new hardware to be distributed.

A) Device ID as a Credential

Most users access the Internet predominantly from a small number of computing devices. If an entity can identify the devices used by each user, it can use the device ID as a second authentication factor. Then, an attacker not only has to obtain a user's password but also has to gain access to one of the user's computing devices (or to the device ID). The use of password and device ID can create stronger, two-factor authentication.

Device IDs can be unprotected, software-protected or hardware-protected. Unprotected device IDs are simply data stored on the machine, which can be accessed by anyone—authorized or unauthorized—who has the ability to read data stored on the machine. The security of the device ID can be protected by hardware or software, which either (a) restricts access to that data only to authorized requesters and/or (b) denies direct access altogether, and only allows indirect access to that data to be used in a cryptographic exchange to generate a session key.

Browser and browser-related software that is already installed on most users' computers today can be utilized to create software-protected device IDs that are relatively difficult to misappropriate. For example, most current browsers support secure cookies. Secure cookies are strings of data that a site may store on a user's computer, which the browser software will not subsequently reveal to any sites except those from the originating domain or sub-domain of the originating site.

Cookies are generally used to recognize users in order to pre-populate data fields and/or to maintain sessions. But cookies can also be used as a device ID. A site may place a unique secure cookie on a user's machine to create a software-protected device ID which unauthorized sites cannot access, and therefore cannot copy and use to impersonate the device. When the user signs on, the site can access the cookie, compare it to the copy of the user's cookie stored in the site's database and, if it matches, have a high level of assurance that the computer being used is the user's computer.

This creates a simple mechanism for creating two-factor authentication for Internet commerce—without additional hardware or software. The device ID protects against an attacker with a stolen password, and the password protects against an attacker with unauthorized access to the user's computer. The attacker must now have both a stolen password and access to the user's computer.

The primary issues with this method are the follows:
1) How to protect against a man-in-the-middle attack?
2) How to protect against malicious software on the user's computer?
3) What to do when the user erases the cookie from his computer?
4) How to allow secure registration of a new computer?

1) Man-in-the-Middle

In a man-in-the-middle attack, the attacker inserts himself between the user and the entity and replays information it receives from one to the other. For instance, an attacker might lure a user to a fake site which looks like the entity's real site. The fake site can then request the user to provide private information such as the user's password. This much can be done with simple phishing techniques, without requiring man-in-the-middle techniques. But if the user contemporaneously expects to see private information from the real site, the attacker must become a man-in-the-middle. For instance, if the user expects to see his PassMark (referred to as "customization information" in the related applications) from the real site before he enters his password, the attacker must collect and replay information between the user and the real site, like this:

When the user provides his username to the fake site, the fake site replays it to the real site. When the real site then provides the user's PassMark to the fake site, the fake site replays the PassMark to the user. And when the user then provides his password to the fake site, the fake site replays the password to the real site.

This type of attack can be automated at the fake site, so that the replays are fast and undetectable. The result is that the fake site can steal the user's password and PassMark, and thereafter masquerade as the user on the real site.

Device IDs protect against this type of man-in-the-middle attack by identifying the user's computer. Because the user's computer will not provide the device ID to a computer from an unauthorized domain, the fake site cannot access the device ID and therefore cannot replay the device ID to the real site. Because the real site will not display the user's PassMark without seeing the user's device ID, the real site will not provide the PassMark (or other private information) to the fake site, and the man-in-the-middle attack is prevented.

Thus, device IDs perform two important functions. First, they provide an easy way to implement two-factor authentication, and second, they provide protection against man-in-the-middle attacks.

2) Malicious Software

Although the browser software will not allow unauthorized sites to access a secure cookie, it is vulnerable if malicious software is installed on the user's computer which compromises the browser software or copies the data in the cookie. Traditional defenses against malicious software are to (a) educate users to take prudent steps to avoid installing untrusted software on their computers, such as not opening email attachments from unknown senders, and (b) encourage the use of anti-virus software which attempts to identify and eliminate malicious software.

One method to mitigate the impact of stolen device IDs is for the site to modify the device ID upon each new session. This way, if a device ID is stolen, once the site is subsequently visited by both the user and the attacker, the site will see a prior version of the device ID and therefore know that the device ID has been stolen. It will not be able to tell which visitor is the user and which is the attacker, but it will be able to shut down both copies of this device ID and separately re-establish a new registration with the user.

As an additional defense against malicious software stealing the device ID, the entity can utilize other attributes of the user's computer. Device IDs can contain or be linked to identifying information about the user's computer, such as the IP address or range from which it connects to the internet. This can mitigate the risk of another computer from impersonating the user's computer, even if the device ID is stolen.

Optionally, software can be installed which interrogates the computer's components (such as a MAC address), distributes itself randomly on the hard disk, or takes other actions to avoid being copied or compromised. If the software can write to the user's computer's hard drive, the site can instruct the software to store data in a variety of locations in files with unpredictable names. Then the site can make requests for unpredictable portions of that data upon each authentication, simultaneously changing other portions of the stored data. Ultimately, with enough time and sophistication, an attacker who can install malicious software on the user's computer can theoretically reverse engineer and defeat any software-only approach to store a device ID on the computer. But this can be made difficult and time-consuming.

3) Diversified Device IDs

One difficulty with software-protected device IDs such as cookies, is that they are sometimes erased by the user or unintentionally overwritten by the site. One approach which allows recovery in the instance of the erasure of a device ID, is to place multiple device IDs on each computer.

The first method is to place secure cookies from multiple domains (each controlled by the site) on the device. Then, if one cookie is erased but the site can read another cookie, it can still authenticate the device and can also restore the erased cookie.

The second method is to create device IDs of multiple types, utilizing secure cookies, Flash shared objects, and other mechanisms which function similarly to allow data to be stored on the user's computer which is subsequently accessible only by authorized sites. Then, for instance, if all the cookies are erased, the site can authenticate the device with a Flash stored object and also restore the erased cookies.

Optionally, software-protected device ID mechanisms can also be included in software that the entity or third-party may have installed on a user's computer, or may be offered to the user as a separate software installation.

By diversifying the number and type of device IDs stored on each computer, the site can significantly decrease the likelihood that all of the device IDs will be erased at the same time.

In addition, the method, location and originating domain of some of the device IDs can be varied by the entity in an unpredictable fashion, making the task of identifying and copying the device IDs more difficult, even if malicious software is installed on the user's computer.

If some but not all of the device IDs are present, the entity can choose to monitor the activity more closely or take precautionary or restrictive measures based on the lower strength of the authentication.

4) Registration and Roaming

The use of a device ID as an authentication factor poses three related questions: (1) How to register the initial device for a user, (2) How to re-register the device if all of the device IDs are erased, and (3) how to register a new device for the same user. Some methods for registering devices are:

(a) Register the initial device simultaneously with the initial registration of the user, when that registration is done over the Internet. (Initial registration only.)
(b) Register the initial device of a previously-registered user upon first use. (Initial registration only.)
(c) Require additional infrequently-requested personal information, such as mother's maiden name, to be provided when registering or re-registering a device.
(d) Pre-establish infrequently-used or one-time-use codes from a previously registered device, to be used to register a new device. (New registrations and re-registrations only.)
(e) Confirm a new device registration after-the-fact from a previously registered device. (New registrations and some re-registrations only.)
(f) Require an out-of-band confirmation when registering or re-registering a device. Out-of-band confirmation can be accomplished, often in a quick and automated fashion, by sending a code to the user via a different communication channel (such as email, phone, fax, instant messaging, or postal mail) which the user must retrieve and relay back to the site.
(g) Require an out-of-band communication which contains a special Internet address (URL) which the user must navigate to in order to register the computer.

Any of the methods above are reasonable policies for certain levels of security. However, methods (a) through (f) are potentially vulnerable to man-in-the-middle attacks. When registering a computer, a device ID does not already exist on the computer, and therefore the device ID cannot be used to protect against man-in-the-middle attacks. If, for instance, a user is lured to a fake site posing as the real site, the fake site can simultaneously attempt to log in to the real site. Then it can request the same information from the user that the real site requests from it, and relay that information to the real site. In this way, the fake site can trick the real site into placing a device ID on the fake site's computer which the real site will subsequently identify as a legitimate device ID of the user.

In the absence of a device ID, the primary way to protect against such a man-in-the-middle attack is to educate the user to be sure to type in a known-good Internet address when navigating to a site to register a computer. However, rather than relying on the user to observe this preventative measure, the entity can enforce adherence by implementing method (g).

In method (g), the entity sends a "registration URL" to the user via a pre-registered out-of-band communication channel such as email, instant messaging or phone. Since the user must navigate to that specific URL in order to register the computer, the entity can ensure that the user—even if previously lured to a fake site—will have navigated to the real site before registering the computer. With this assurance that it is dealing directly with the user, the entity can then place a device ID onto the user's computer.

To protect against man-in-the-middle attacks against the registration URL, the URL can be a special URL—varied, randomized or customized for each registration—so that an attacker can not know or predict the URL. Otherwise, an attacker which had lured a user to a fake site could itself navigate to the URL and mount a man-in-the-middle attack by replaying the data passed between the real site and the user and tricking the real site into placing the new device ID onto the fake site's computer.

Because each registration URL is unique, the entity knows which user it has been assigned to, and can therefore immediately display that user's PassMark and request the user's password, to further authenticate the user and confirm the registration of the user's computer.

In the instance that the registration URL is sent to the user via email or instant message, the user can have confidence in the authenticity of the URL because (a) it was sent contemporaneously with his request to register a computer, and (b) it can include the user's PassMark affirming that the email came from the entity. The user can therefore confidently and conveniently click on the registration URL displayed in the email.

In the instance that the registration URL is sent to the user via phone (or some other channel that requires the user to re-type the URL into his browser), the URL can be constructed so that it is as short and easy to type as possible. By appending alphanumeric characters to a simple Web site address, a large number of unique addresses can be created. Appending three alphanumeric characters (for example, www.largebank.com/a3q) generates 46,656 unique URLs. (If case sensitive, three alphanumeric characters generate 238,328 unique URLs. But differentiating between upper and lower case letters is more complicated for the user, and if the codes are expired and recycled periodically, 46,656 variations are sufficient for most situations.)

When registering a computer, a device ID is not present so a second-factor authentication using the device ID is not possible. This is one of the situations in which the use of a phone as a second factor of authentication is particularly valuable.

B) Mobile Phone as a Hardware Token

Today, two-factor authentication is typically implemented by issuing to the user an object—such as a paper certificate, magnetic card, smart card, key fob or other hardware token. In many circumstances, it would be beneficial to be able to use objects already in the possession of the users, rather than having to distribute new objects. Communicating devices—and in particular the mobile phone—can be used in this way using the methods described in this section.

For example, when a user enters his username to sign onto a Web site, the site can immediately call the user's phone number and provide a unique code to the user, which the user then enters into the site along with his password. This simple method provides strong two-factor authentication: (1) something you know—the password, and (2) something you have—the phone. If an attacker steals the user's password, he cannot log in because he needs the phone to get the secret code. And if an attacker steals the phone, he cannot sign in because he needs the user's password.

In this way, a common everyday item routinely carried by millions of users—the mobile phone—can be instantly and easily transformed into an authenticating hardware token.

1) Authenticating an Object

There are three general approaches to authenticating such an object: (1) physical inspection of the object (for instance, the examination of a watermark) (2) extraction of a secret code from the object (for instance, a static secret such as a serial number or a dynamic secret such as a code from a one-time pad), and (3) challenge/response with the object (for instance, a cryptographic interaction with a smart card). Variations of the second and third approaches can be applied to objects such as a mobile phone.

Static Secret. There may be an unchanging secret on or in the phone, which can be obtained by someone in possession of the phone. Like the CVV number on the back of a credit card, this offers very weak security, because an attacker can obtain the secret through previous possession of the object or through observation of previous entry of the secret. It does not assure that the user has current possession of the phone.

One-Time Pad and Code-Hopping. The phone can be programmed to generate a sequence of different unique codes which the site knows or can generate, using either a one-time pad (a long list of pre-defined codes) or a code-hopping cryptographic algorithm (a function which generates sequential codes which are difficult to analyze or predict unless one knows the algorithm). In this way, the site can protect against the re-play of a previously-used code and protect against a stolen code once a subsequent code has been used. This is more secure than a static code, but still does not assure that a code was not previously obtained in the absence of a subsequent use, and therefore does not assure that the user has current possession of the phone.

Time-Based Code. The phone can be programmed to generate a code that is the cryptographic result of a secret key and the current time, which can be supplied by the phone's internal clock and/or provided by the phone network. By requiring a code generated with the current time, the site can assure that the user has current possession of the phone.

Challenge-Response. The phone can be programmed to accept a unique challenge code provided via the web site and provide a response code generated by a cryptographic function within the phone. Since the site can vary the challenge (within the constraint of the length of the challenge code), if the response is valid it can assure that the user has current possession of the phone. However, while this method requires data to be communicated in two directions (to and from the phone), the other methods are simpler for the user because they only require data to be communicated in one direction.

Out-of-Band Channel. The phone's communication channel can be used as a real-time side-channel for conveying secret information. For instance, the phone can be used to enter a password or PIN independently from the computer's communication channel with the site.

Out-of-Band Code. The phone's communication channel can be used to transmit a unique code in real time. Once that unique code is sent over the phone and returned via the Web site (or vice versa), the site can be assured that the user has current possession of the phone.

Out-of-band URL. The phone's communication channel can be used to transmit a unique URL in real time. Since the URL is unique, it can serve a dual purpose—both URL and secret code. Once the user navigates his browser to that URL, the site can simultaneously be assured that the user has current possession of the phone and that there is no man-in-the-middle between the site and the user.

Time-based codes and challenge/response codes are useful for situations in which (a) the cost of communication via the phone is prohibitively expensive, (b) communication with the phone is unreliable, because the user may not have his phone turned on or may be out of range of the signal, or (c) communication with the object is not available, such as when the object is a PDA rather than a phone. However, because these methods require programmable phones and the installation of special software, they are less easily adopted for widespread use. In addition, they are potentially vulnerable to attacks in which the software and secrets on the phone are copied.

Out-of-band channels, codes and URLs are generally the most useful in widespread consumer e-commerce, because they require no special programs to be installed on the user's phone, and can function with all types of phones, including traditional wired telephones and non-programmable phones. All the site needs to do is register the phone number of its users and implement an outbound dialing mechanism to communicate unique codes and URLs. Such second-factor authentication can be used universally or selectively—for instance, only for high-value transactions or only for special activities such as registering a device ID on a new computer. By automating the process, it can be quick and easy for both the site and the user.

2) Transfer Methods

Depending upon the method being employed, the codes and URLs can be transferred from the phone to the computer (or vice versa) in a number of ways.

Voice. The code can be communicated from the phone to the user by voice (using recorded human voices or computer-generated voices), and the user can enter the code into his computer. Vice versa, the computer can display a code to the user, who can speak the code into the phone for interpretation by a speech-to-text voice recognition engine.

Text. The phone can display text (sent, in the case of out-of-band codes, by SMS or similar text-messaging service) to the user, who can enter the text into his computer. Vice versa, the computer can display text to the user, who can enter the text into his phone. Optionally, if the phone and computer can establish an electronic link (for instance, by using local wireless connectivity such as WiFi or Bluetooth), the code can be transferred directly and without requiring the user to convey the information.

Tones. The phone can create computer-generated and computer-readable noises (such as DTMF tones) conveying the code, which the computer can record using its microphone. Vice versa, the computer can create noises conveying the code, which the phone can record it using its microphone.

Voice is generally the best method for out-of-band codes in consumer e-commerce. The site uses an automated dialer and voice-generator to "speak" the code to the user over his phone. This works with any phone, and requires little user training.

Text is generally the best method for other types of codes (which are generated within the phone itself), because it does not require voice-generating functionality in the phone.

Tones are potentially valuable in that they allow the phone and the computer to transmit data directly and eliminate the need for the user to enter data himself. But the use of tones requires an active speaker and/or microphone on the computer, special software installed or running on the computer, and some training for the user.

3) Authentication Processes

The authentication process requires that secret information be transferred between the user and the site, and there are a number of different process flows which may be employed.

In the case of static, one-time pad, code-hopping and time-based codes, the user simply obtains the secret from the phone and provides it to the site, usually after the site has requested the secret.

In the case of challenge/response codes, the site (or some other mechanism the site trusts) must first generate a unique challenge code and provide it to the user. The user then provides that challenge to the phone, and the phone provides the response code to the user, who provides it to the site. This process flow can be automated, for instance if the phone and the computer can communicate via computer-readable tones, the computer can facilitate a direct two-way communication between the phone and the site via the computer without requiring the user to relay (or even understand) the secret data.

Figure 2:
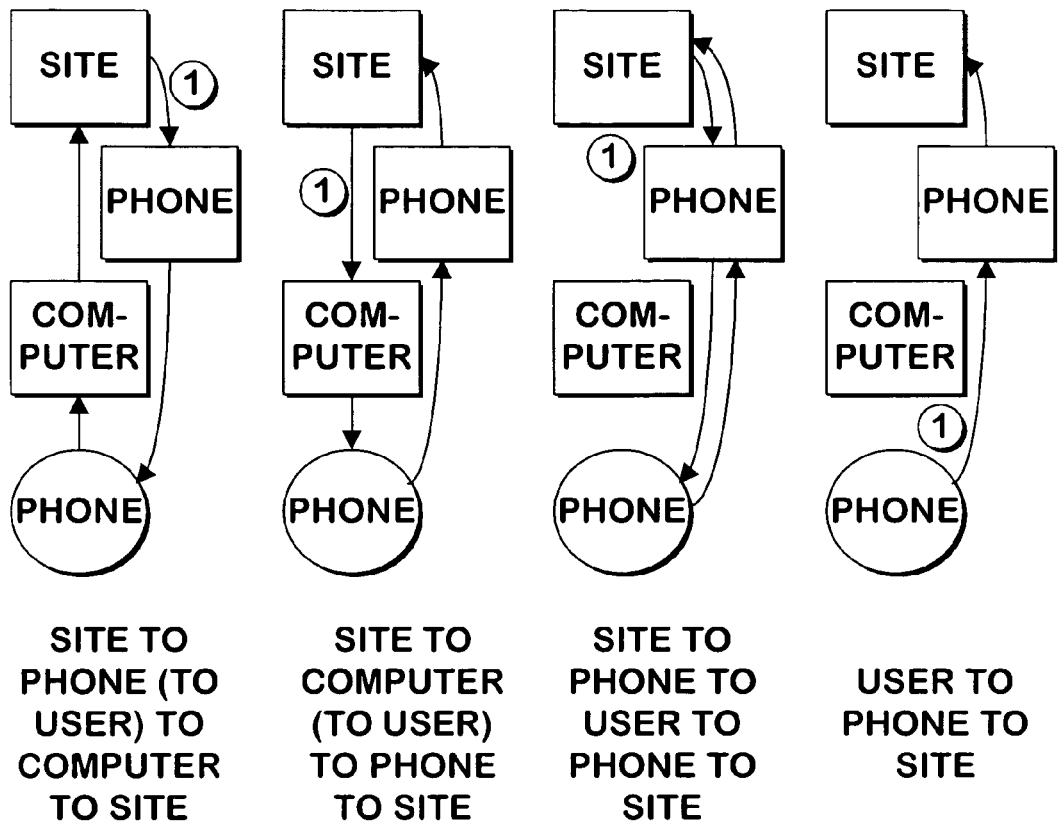
FIG. 2 are information flow diagrams of authentication process information flows according to various embodiments of the present invention.

In the case of out-of-band channels, codes and URLs, the process flows are more varied. The principal variations are illustrated in FIG. 2:

Referring now to FIG. 2, each of these variations will now be explained:

Site to phone (to user) to computer to site. When the user attempts to sign on to the site (or perform an activity requiring authentication), the site originates a call to the phone and provides a secret to the user. The user obtains the secret from the phone and enters it into the computer, which sends it back to the site. Optionally, the computer can transfer the secret directly to the computer without user intervention, if a means to do so (such as tones or local wireless connectivity) is available.

Site to computer (to user) to phone to site. The same as above, except that the direction of the flow is reversed. The site provides the secret to the computer, the user transfers the secret to the phone, and the phone communicates the secret back to the site.

Site to phone to user to phone to site. The site contacts the user via the phone, and the user responds. The response can be a simple acknowledgement (to indicate that the phone is in the responder's possession), or it can be a secret such a password or PIN (to add assurance that the responder is the user). In the latter case, the secret need not be transmitted via the computer and is thereby protected from potential attacks in that channel.

User to phone to site. The user originates a phone call to the site and provides an acknowledgement or acknowledgement-and-secret to the site. This can serve as an indication that the user is concurrently attempting to sign into the site using the computer, or attempting some other form of authentication. If the user originates the phone call, the site uses incoming dialed-number identification methods to ascertain the phone number of the originating phone.

In consumer e-commerce, the first option is generally the most convenient variation. When the user is attempting to sign in or otherwise authenticate himself to the site, the site sends a unique code to the user via his phone. When the user sends that code back to the site via his computer, the site is assured that the user has possession of the phone.

Another convenient variation is the third option, in which the site contacts the user using the phone and requests the user to enter his password or PIN. This has the advantage of eliminating the need to enter the password into the computer, but has the disadvantage of being less tightly-coupled with the session between the computer and the site. (Unless a session code is also passed between the computer and the phone, the coupling between the computer session an the phone session must be inferred, based on concurrent timing.)

For added convenience in the instance when a user has multiple phone numbers, the site can display a list of registered phone numbers (displaying nicknames rather than the actual phone numbers to prevent attackers from gathering that information) and the user can choose which one to use for each authentication session.

4) Types of Authenticating Objects

Although the authenticating object referred to above is a wireless phone, it can be any type of communication channel (in the case of out-of-band channels, codes and URLs) or computing device (in the case of code-hopping or time-based codes).

Any communication channel that can send a private message to a specific device can be used to transform that device into an authenticating object. The strength of that authentication rests on the security of the addressability and privacy of that communication channel. The device can be a wireless phone, a wired phone, an addressable radio, a modem, a computer, or any other addressable communication device other than the original computer through which the user is attempting to establish an authentication with the site.

With somewhat less security, the original computer can also be used for an out-of-band channel, code or URL. For instance, out-of-band codes can be sent via email, instant messaging, file-transfer-protocol, Web services, or other communication channels other than the channel through which the user is attempting to establish an authentication with the site. In this instance, the site cannot ensure the user's possession of another physical object (such as the phone), but it can assure the user's access to another communication channel (such as an email address). This type of second-channel authentication is very convenient but it is somewhat less secure, because two communication channels accessed by the same device (the computer) are generally more susceptible to similar attacks than two communication channels accessed by different devices (the computer and the phone)—it does not quite confirm "something you have", but it does confirm "something you have access to.". However, email and instant messaging can provide an easy and ubiquitous channel for out-of-band communication of authenticating information. For instance, when a user signs onto a web site, the site can send an instant message to the user showing his PassMark and requesting his password.

Any computing device (other than the original computer) which can implement one-time-pads, code-hopping or time-based codes can be used as an authenticating object. This includes programmable phones, PDAs, calculators, watches, and other devices.

In consumer e-commerce, the most convenient communication channels are phone, email and instant messaging. And the most convenient devices are programmable wireless phones.

5) Types of Access Points

As referred to above, the access point attempting to authenticate the user is a Web site. However, it can be any type of access point, including a Web site, a Web service, an application, a wired or wireless network, a computer, a kiosk, a point-of-sale terminal, a physical entry point, or any interaction point requiring authentication of the user. For example:

Data Access. Access to data and functionality on a network can require that a user ID be entered into the computer, which then relays the data to a central server which calls the user's phone for a code-exchange, such as the entry of a password or PIN into the phone or a session-based secret into the computer.

Physical Access. Entry into a high-security building can require that a user ID be entered into an access control terminal at the door, which then relays the data to a central server which calls the user's phone for a code-exchange, such as the entry of a password or PIN into the phone or a session-based secret into the access control terminal.

Physical Payment. Payment can be authorized by entering a user ID (such as the user's account number or phone number) into a point-of-sale terminal, which then relays the data to a central server which calls the user's phone for a code exchange, such as the entry of a password or PIN into the phone or a session-based secret into the point-of-sale terminal. This is particularly valuable for enabling physical (face-to-face) payment transactions to receive two-factor authentication without requiring a traditional token such as a credit or debit card.

Electronic Payment. Similarly, electronic payments can be authenticated by an out-of-band call to the user's phone. This is valuable for enabling electronic (Internet-based) payment transactions to receive two-factor authentication without requiring a card reader or other hardware to be installed on the user's computer.

6) Three-Factor Authentication

Use of the third authentication factor—something you are—typically requires a reader to take a biometric measurement, such as a scanner to read a fingerprint or a camera to take a photograph. When using a telephone as an authentication device, the phone's microphone can be used as a biometric reader to take a voiceprint from the user. In this way, three-factor authentication can be achieved without requiring the distribution or installation of new hardware.

Voice recognition can be performed on a static or dynamic challenge-phrases. With a static phrase, the user is asked to say a phrase that he has previously recorded with the site, and a biometric comparison is made to the previously-recorded version. With a dynamic phrase, the user is asked to say a new phrase, and his general vocal patterns are compared with the general vocal patterns of different previously-recorded phrases. Since it is easier to match the vocal patterns when the user repeats the same phrase, static phases offer the most reliable matching. However, because static phrases can be recorded and replayed by an attacker, some high-security situation may warrant a dynamic phrase instead of or in addition to a static phrase.

C) Device ID versus Phone

The device ID (which identifies the user's computer) and the user's phone are both "second-factor" authentications—something you have. In most instances, using multiple authentications of the same type does not add as much security as adding multiple authentications of different types. However, the device ID provides a special type of protection that the phone cannot, and therefore adds and extra dimension to the overall strength of the authentication even when a second authenticating object such as phone is also used.

The traditional use of a second-factor authentication is to confirm that the user has possession of an object. A code exchange using a phone provides a stronger second-factor authentication than a device ID exchange using a computer, because the device ID is vulnerable to misappropriation by malicious software installed on the computer. Therefore, for this purpose a phone is generally superior to a device ID.

Figure 3:
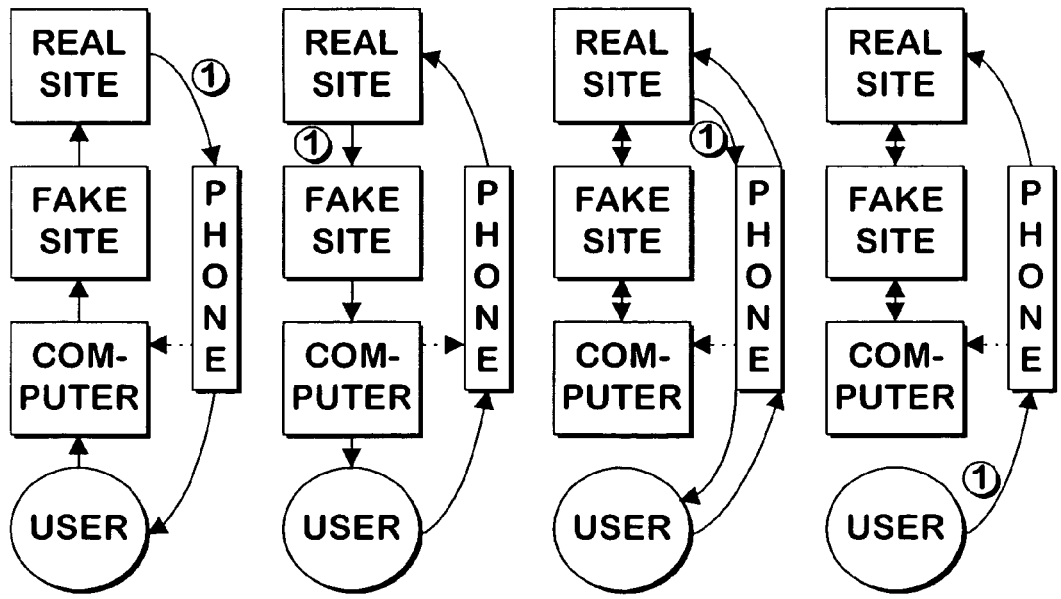
FIG. 3 are information flow diagrams of authentication process information flows for attempted man in the middle attacks according to one embodiment of the present invention.

However, use of a device ID also protects against a man-in-the-middle attack, which use of a phone does not. A user who authenticates a computer session with a Web site by doing a code-exchange using a phone, has no assurance that he is not interacting with a fake site which is then replaying the information that the user enters back to the real site. The real site will perform the authentication with the phone, and allow the fake site to sign on to the real site as the user as shown in FIG. 3.

Because the computer will not provide the device ID to a site with an unauthorized domain, the fake site is not able to mount a man-in-the-middle attack when a device ID is used. Therefore, the combination of these two sub-types of second-factor authentications provides protection against a broader set of attacks than either one used alone.

D) Tiered Authentication Policies

These methods of authentication can be systematically combined to create an authentication policy that maximizes user convenience for most interactions and imposes greater security requirements for critical interactions.

For instance, here is a description of an authentication policy that a bank might employ:

Public Web Site Access. For access to the bank's public web site, no authentication is required, but device IDs are placed on each visitor's computer to monitor for suspicious activity.

Private Web Site Access. For access to a user's account, the bank site must see a device ID registered to the user, and then go through a username-PassMark-password exchange.

Registering a Computer. To register a computer, the user must confirm the registration using an out-of-band URL sent via his email.

High-Value Transactions. To authorize more that $1,000 per day in payments and transfers from his bank account, the user must confirm the payments using an out-of-band code sent via his phone.

High-Security Customers. For users such as commercial account holders who frequently make high-value transactions, the bank can install software on the user's programmable phone which will generate time-based codes, thus allowing the user to use his phone as a second-factor authentication even when his phone has no signal.

Critical Transactions. For wire transfers in excess of $50,000 per day, the user must confirm the transactions with three-factor authentication using a challenge/response voiceprint sent via his phone. And for individual wire transfers in excess of $100,000, two authorized users must confirm the transaction ("two-man rule").

This type of tiered authentication policy provides the bank with significantly enhanced security versus a simple username-password authentication policy. Every interaction conveying private data is protected with two-factor authentication and protected against man-in-the-middle attacks, and critical interactions are protected with even higher security via out-of-band channels and hardware authenticators.

Yet because all these tiered policies utilize software and hardware that the user already possesses, the cost and complexity of implementing them is low. And, most importantly, because the user experience is simple and mostly-unchanged, user training is minimal and user acceptance is high. The net result: easy and cheap—but effective—two-factor authentication.

Figure 4B:
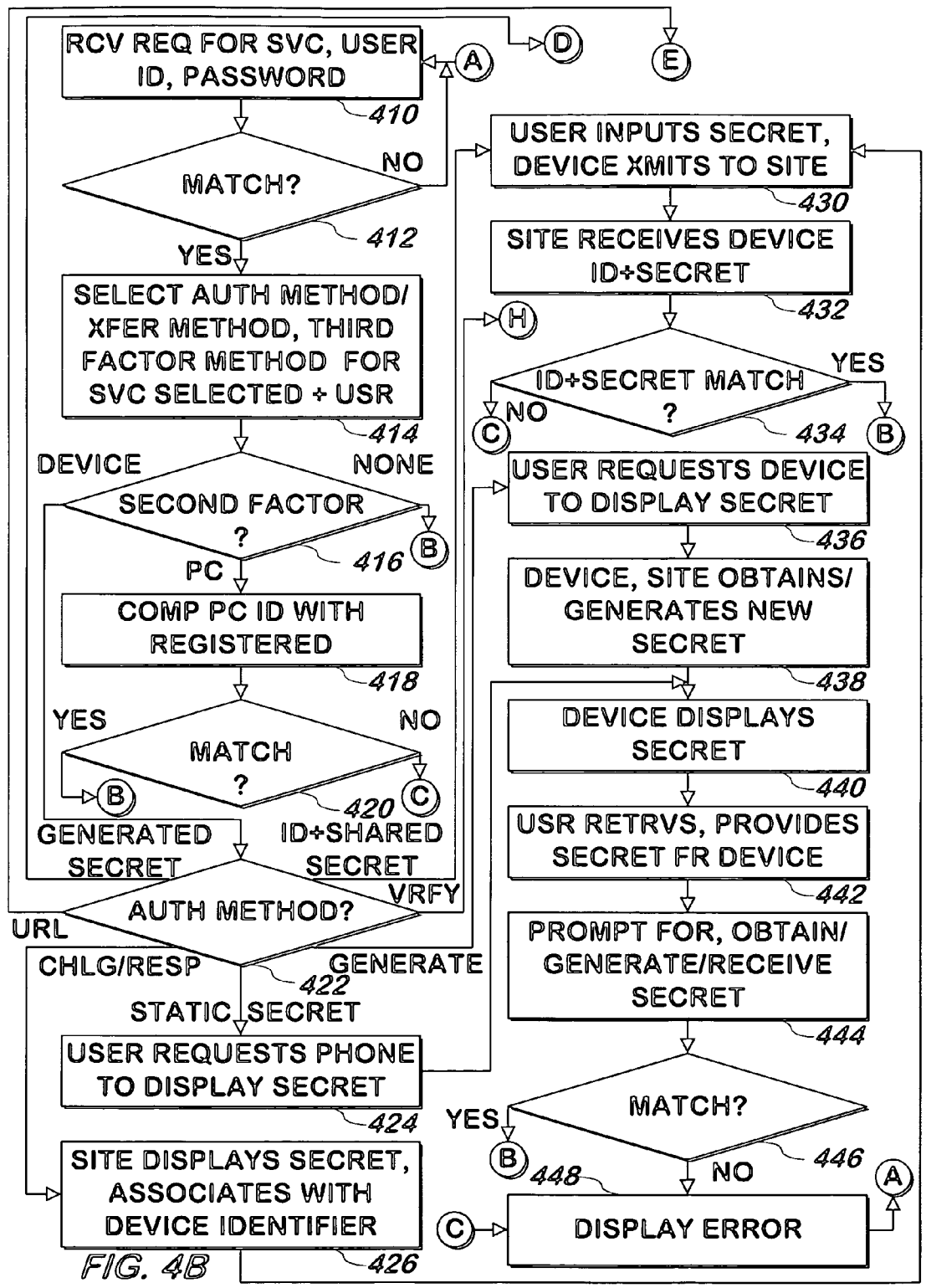
FIG. 4, consisting of FIGS. 4A, 4B, 4C and 4D, is a flowchart illustrating a method of authenticating one or more users using two or more factors according to one embodiment of the present invention.

Referring now to FIG. 4, consisting of FIGS. 4A 4B, 4C and 4D, a method of authenticating a user is shown according to one embodiment of the present invention. The method involves several subprocesses, each of which will now be described.

Registration

Beginning with FIG. 4A, an attempt is made to identify and authenticate the user using any of the techniques described above 402 such as the receipt of a user identifier, the display of customization information associated with that user identifier, and the receipt of a password, or the user may be physically authenticated by an administrator, such as by verifying the appearance of the user with a government issued ID card. If the user is authenticated 404, the method continues at step 406. Otherwise 404, the method continues at step 402.

At step 406 one or more device identifiers, such as encrypted cookies, and/or other identifiers are stored on the user computer system or one or more device identifiers, such as MAC addresses are retrieved from it, as described above, or other device identifiers, such as a mobile device identifier (e.g. a mobile telephone number), are received. Step 406 may include downloading software onto a user's device that derives a device identifier, such as a program that reads the values of various characteristics of a user's computer system and creates a numeric "fingerprint" of the system, which is then read as a device identifier. Step 406 may include downloading to the user's computer system software that provides an identifier unique among other users. Step 406 may include reading several device identifiers from the same device, such as a MAC address and IP address.

Step 406 may include receiving from the user one or more biometric samples, such as a fingerprint, sufficient voice data to extract a voiceprint, an iris scan or the like. Step 406 may include preprocessing the biometric data, for example, to extract a voiceprint from the voice samples using conventional techniques. Step 406 may include installing software on the user's mobile device for use as described below.

The device identifier, other identifiers or biometric data are associated 408 with a user identifier. Steps 402-408 may be repeated any number of times for the same computer system or different computer systems, or different device identifiers or biometric data.

Request for Service and Identification of the Factors

After steps 402-408 of FIG. 4A are performed, the user can then authenticate himself or herself as part of a request for service. The request for service may be a request for a web page, a request for access, such as physical access to a location, or a request for an action to be performed, such as the transfer of cash or securities from one account to another account.

Continuing at FIG. 4B, the user may make the request for a service 410 and provides the user identifier and password of the user. The user identifier identifies the user and the password provides the first factor authentication of the user. If the password doesn't match the user identifier or the user identifier is not registered 412, the method may continue at step 410 (after reprompting the user) and otherwise 412, the method continues at step 414. At step 414, an authentication method for the second authentication factor, transfer method(s) for the second authentication factor, and third factor method are identified based on the type of service requested, the user identifier, or both. The user identifier may be used, for example, to identify a stronger authentication for users for which the device identifier was supplied in a different manner than those for which a lesser authentication is identified.

Authentication Using the Second Factor Identified

If no second factor is to be used 416, the method continues at step 470 of FIG. 4D. If the authentication method for the second factor is the retrieval of a device identifier from the user's computer system 416, the device identifier for the second factor is retrieved from the user's computer system and compared with that registered for the user 418. Step 418 may include redirecting the user to one or more different domains if a cookie cannot be found. Step 418 may involve reading any one or more of the device identifiers registered as described above. Multiple device identifiers may be read to verify any of the others. If the device identifier matches one of those registered 420, the method continues at step 470 and otherwise 420, the method continues at step 448.

If the authentication method for the second factor involves a mobile device 416, the method continues at step 422.

If the authentication method for the second factor identified is a static secret 422, the user requests a mobile device such as a mobile telephone to display the secret 424, and a program installed on the mobile device, such as at the time of registration as part of step 406 or shortly thereafter, causes the mobile device to display the secret 440. The user retrieves the secret from the phone or other mobile device and enters it into a web page supplied by the web site 442. The web site prompts the user for the secret, receives the secret and locates the actual secret for that user on a database of secrets for the user. If the received secret matches the actual secret 446, the method continues at step 470 and otherwise 446, the user is notified of the error 448. Step 410 may follow step 448 in one embodiment. As used herein, a mobile device is a battery-powered device that communicates wirelessly.

If the authentication method identified is a generated shared secret 422, the user requests the device to obtain, using any of the methods described above, the secret 436, and the device and the site both obtain the secret in the same manner 438. The device displays the secret 440 and the user obtains the secret and enters it to the site 442. The site prompts the user for the secret and receives it (the prompt may be provided before the user enters the secret) 444 and the method continues at step 446 as described above.

If the authentication method is a shared secret plus a device id 422, the user inputs the secret to the device and the device transmits the secret and an identifier of the device such as a mobile phone number, to the site 430. The site receives the device identifier and the secret 432 and compares the secret it has stored for the identifier of the device that may have been provided to the user using an out-of-band technique such as e-mail or regular mail or received from the user via an out-of-band process (either of which may instead use an in-band process: a web page or telephone call). If the device identifier and secret received match those stored for the user 434, the method continues at step 470 and otherwise 434, the method continues at step 448 as described above. In one embodiment, step 420 includes timestamping the device identifier and secret and step 434 also includes comparing the timestamp with the current date and time and considering that a match has not occurred if the difference between the timestamp for the device identifier and secret and the current date and time exceeds a threshold.

If the authentication method identified is challenge and response 422, the web site displays a secret 426 on the user's computer system and associates the secret with the mobile device identifier for the user, the user inputs the secret to the mobile device 430 and the method continues at step 432 as described above.

If the authentication method identified is a generated secret 422, the method continues at step 450 of FIG. 4C. At step 450, the site sends to the mobile device a secret that it associates with the device identifier and the user receives the secret on the mobile device and enters it to the site, via a web page the site generates 452. The web site receives the secret, and compares the secrets for the device identifier of the device the user is using with that stored for the user 454 and if the secrets match 456, the method continues at step 470 and otherwise 456, the method continues at step 448.

If the authentication method identified is a URL 422, the method continues at step 460 of FIG. 4C. At step 460, the site sends to the mobile device a URL that it associates with the device identifier and the user receives the URL on the mobile device and enters it to the user's browser 462. The web site receives the URL, and compares the URLs for the device identifier of the device the user is using with that stored for the device 464 and if the URLs match 466, the method continues at step 470 and otherwise 466, the method continues at step 448.

Check for Other Authentication Steps, Provide Service when all are Completed

Referring now to FIG. 4C, at step 470, if authentication is complete, access to the requested service is provided 474. Otherwise, the method waits 472 for such steps to be completed, or performs additional steps. In one embodiment, the steps required for complete authentication may include performing a third authentication using biometrics as described more completely below, or receiving a request for the service by a second authenticated user, for example, under a two man rule. The authentication steps may be determined using the requested service, the user requesting the service, or both, and may be determined as part of step 420.

Use of Transfer Methods

When information is provided to or from the mobile device as described above, a transfer method may be employed in either direction, as determined as part of step 420. The transfer of information to the mobile device may be different from transfer from the mobile device. Any such transfer may employ the method of FIG. 5.

Referring now to FIG. 5, if the transfer method is automatic to and/or from the telephone 510, text is provided to and/or from the mobile device to a computer system that can authenticate the mobile device, and the computer system provides the text to the server 512. If the transfer method is text 510, text is provided or received to or from the mobile device 514. If the transfer method is tones 510, tones are provided to or from the mobile device and decoded 516.

If the transfer method is voice 510, voice is provided or received 518. If voice is provided, step 518 may include converting text or commands to speech using conventional techniques. If voice is received as part of step 518, the voice is decoded 520, either using conventional speaker independent speech recognition, or, if the voice is received in a manner that enables the identification of the speaker, such as via a telephone that provides its device identifier, and that device identifier is associated with a user, speaker dependent voice recognition can be used. The speaker dependent voice recognition uses voice registration information that the user has previously provided and associated with the user identifier or mobile device identifier, such as may be a part of step 406.

If a third factor of authentication was identified as part of step 420 and the method for the third factor was voice recognition 522, conventional speech pattern matching or other speaker-dependent voice recognition techniques can be used to further authenticate the speaker 524 and if no match occurs with a level of confidence exceeding a threshold, 526, the method continues at step 448. If the method of FIG. 5 terminates otherwise, it continues 528 as described in FIG. 4.

Other Authentication Steps: Biometric Authentication

Referring now to FIG. 6, a method of biometrically authenticating a user is shown according to one embodiment of the present invention. The steps of FIG. 6 may be performed as part of step 472 of FIG. 4C, and may represent a third factor of authentication determined in step 414 of FIG. 4. (As noted above, the third factor may be employed as part of the receipt of voice data, or, as described below, it may be performed separately as part of step 472).

If voice is the third factor of authentication 610, a challenge phrase or action is issued 612, and a response, such as a version of the challenge phrase spoken by the user, is received and optionally processed. If another biometric method is the third authentication factor 610, a biometric sample is requested and received 620. The request of step 620 can, for example, be a request for a fingerprint and the sample can be received by placing of a user's finger on a reader, which may be received by reading the fingerprint. The biometric response is compared 614 to biometric characteristics registered for the user 614 at a time that the user can be authenticated, such as may have occurred as part of any of steps 402-408, for example by asking the user to call into a conventional voice recognition system and prompt the user to speak certain phrases that can be used to extract a conventional voiceprint from the phrases. If a sufficient correlation exists between the response received in step 612 or 620 and the biometric characteristics registered for the user 616 using a threshold confidence level, the third factor authentication is considered to have passed for that user 618, and otherwise 616, the method continues at step 448.

System Description

Figure 7:
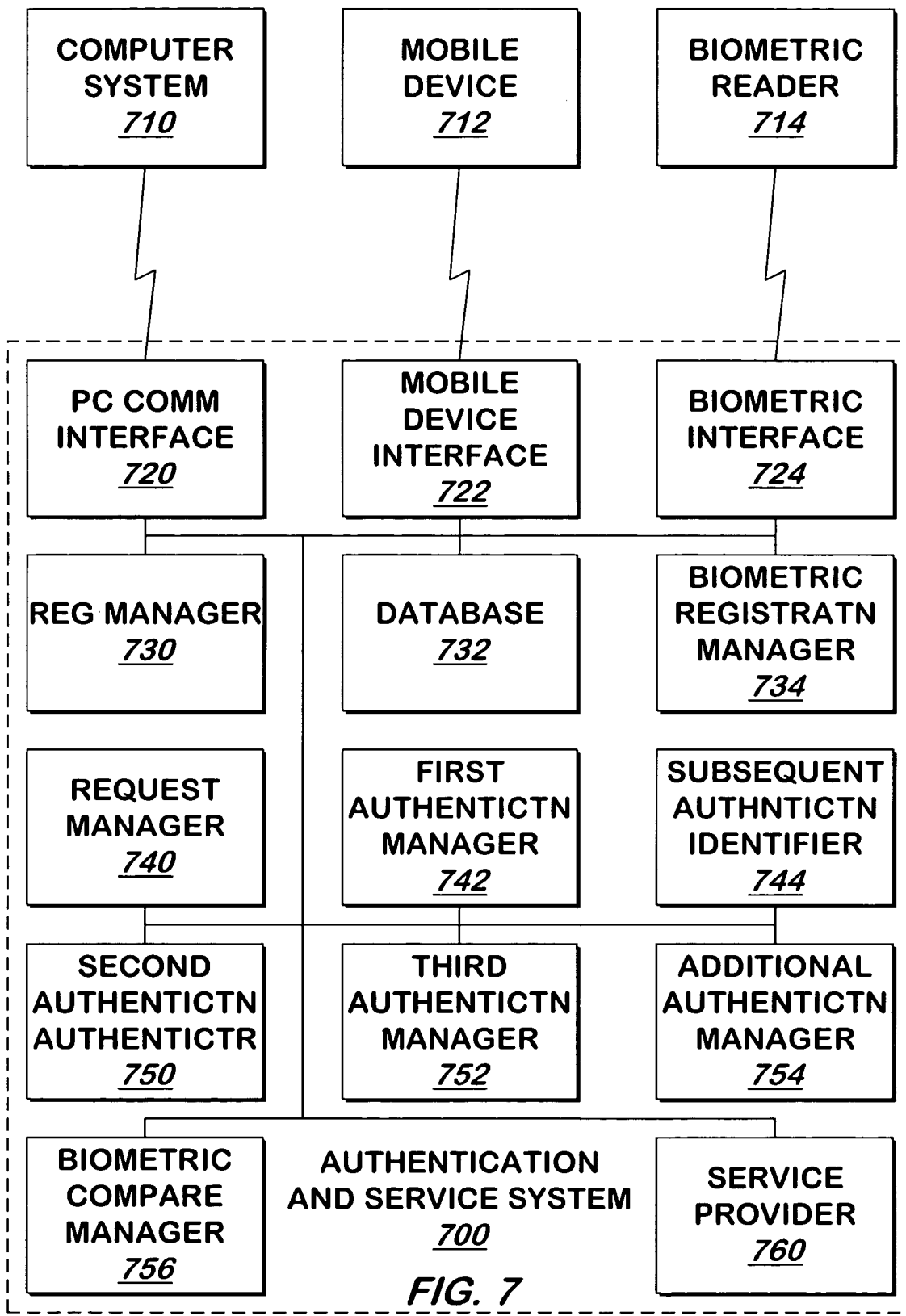
FIG. 7 is a system for authenticating a user using two or more factors according to one embodiment of the present invention.

A user may use a system, such as that shown in FIG. 7 to authenticate himself or herself to a system, such as a computer system (e.g. a web server or other computer system), to allow the system to process a request made by the user or another party. Referring now to FIG. 7, a system for authenticating a user to a computer system 700 to allow the computer system to process a request is shown according to one embodiment of the present invention.

Computer system 710 is a conventional computer system as described above, and may contain a conventional communication interface, such a conventional communication interface running TCP/IP, Ethernet, or both and may support other conventional communication interfaces.

Computer system 710 communicates over a network such as the Internet with authentication and service system 700 via PC communication interface 720, which is a conventional communication interface, similar or identical to that described above. Authentication and service system 700 includes a conventional computer system containing one or more computers. When the user connects to a registration portion of a web site hosted by authentication and service system 700 via PC communication interface 720, PC communication interface 720 provides the connection to registration manager 730. Registration manager 730 authenticates the user and performs the other registration steps described above, optionally storing one or more cookies, encrypted cookies, or software on the user's computer system 710 and stores into database 732 any identifiers of the computer system associated with the user, read from the user's computer system as described above. During the registration process, the user may supply via computer system 710 the identifier of one or more mobile devices, such as mobile device 712, which may be any conventional mobile device such as a mobile telephone. Registration manager 730 stores such identifier in database 732.

The user may also supply one or more biometric samples to authentication and service system 700 via biometric registration manager 734. The user may receive a code from registration manager 730 after the user has authenticated himself to registration manager 730, and registration manager 730 stores the code into database 732. The user then enters the code (for example by speaking it) to biometric registration manager 734 to authenticate himself or herself. In another embodiment, biometric registration manager 734 is only available via a secure physical location, and the user must physically authenticate himself to an administrator who controls access to biometric registration manager 734. Biometric registration manager 734 receives the one or more biometric samples (e.g. voice samples, fingerprints, iris scans, etc.) from the user via biometric reader 714, which may be a conventional telephone, fingerprint reader or other means of receiving biometric samples. Biometric reader 714 provides the samples to biometric interface 724, which is a conventional interface such as a telephony interface suitable for communicating with biometric reader 714. Biometric registration manager 734 may preprocess the sample, converting voice samples into a conventional voiceprint, for example, and stores it into database 732 associated with the user identifier to which the user corresponds, entered into biometric registration manager 734 by the user or system administrator via a computer such as computer system 710. Biometric interface 724 may work together with PC communication interface 720, to perform all tasks required to register one or more biometric samples to database 732, and associates the samples with the user identifier of the user for use as described below.

Mobile device interface 722 is a conventional communication interface that allows communication with the mobile device via voice, text, tones or otherwise. In one embodiment, mobile device interface 722 includes biometric interface 724, and mobile device 712 and biometric reader 714 are a single device.

Although only one of the devices 710, 712, 714 are shown, there may be multiple such devices, with the number of users using any device 710, 712 being one, or a small number of users relative to the total number of users registered to authentication and service system 700.

When the user makes a request, it may be made to a portion of the site that PC communication interface 720 identifies as a request, and so PC communication interface 720 forwards the request to request manager 740. Request manager signals first authentication manager 742, which prompts the user for his or her user identifier and password, optionally providing customization information to the user before prompting for the password as described in the related applications. First authentication manager 742 compares the password to that associated with the user in database 732 and if a match occurs, first authentication manager 742 provides the user identifier of the user to request manager 740.

Request manager 740 provides the user identifier and the request or type of request to subsequent authentication identifier 744, which returns to request manager 740 the type and mode of any subsequent authentication factor or factors that should be used to authenticate the user for the request. Subsequent authentication identifier 744 provides this information either by looking it up in database 732 based on the user and type of request (e.g. each user may have stored the type and mode of the authentication factor or factors that should be used for each type of request, and subsequent authentication identifier 744 retrieves it based on the user identifier, type of request or both) or subsequent authentication identifier 744 uses an internally stored lookup table to retrieve it based on the type of the request, and optionally, the type of the user, which may be stored associated with the user identifier by a system administrator in database 732.

If the type of any subsequent authentication factor is "none", request manager 740 provides the request and user identifier to service provider 760, which fulfills the request. If the type of any subsequent authentication factor is other than none, request manager 740 provides the type and mode of the second authentication factor and any third authentication factor to second authentication manager 750.

Second authentication manager 750 performs the second authentication described at steps 416-466 of FIG. 4 based on the type and mode of the second authentication factor. If second authentication manager 750 is able to authenticate the user as described above, second authentication manager 750 signals request manager 740.

If the mode of communication from the user of the second authentication factor is voice and a third authentication factor is indicated to be voice recognition, the speech collected by second authentication manager 750 is provided with the user identifier, an indication that the biometric sample is a voice sample, and the type and mode of the third authentication factor by second authentication manager 750 to third authentication manager 752.

Third authentication manager 752 provides the voice sample, indication, user identifier and type and mode of the third authentication factor to biometric compare manager 756.

When it receives a biometric sample, indication, and user identifier, biometric compare manager 756 compares the sample to the biometric registration information stored in database 732 and associated with that user identifier by biometric registration manager 734 as described above. If a correlation between the sample received occurs with the registration data for that user identifier with a sufficient confidence threshold, biometric compare manager 756 returns an indication that the biometric sample is a match.

If the mode of the second authentication factor is not voice, or the type of the third authentication factor is not voice recognition, if a third authentication factor exists, second authentication manager 750 provides the type and mode of the third authentication factor to third authentication manager 752, which implements the third authentication method described in steps 610-620 of FIG. 6, using biometric compare manager 756 as described above to compare the biometric sample received from the user via biometric reader 714 and biometric interface 724 with that registered for the user as described above.

Third authentication manager 752 investigates the indication it receives from biometric compare manager 756. If the indication indicates a correlation, third authentication manager 752 returns to second authentication manager an indication that the user was authenticated, and second authentication manager 750 returns an indication that the user was authenticated to request manager 740. Request manager 740 then provides the request and user identifier to service provider 760, which provides the service.

In one embodiment, subsequent authentication identifier 744 may also provide to request manager 740 any additional authentication criteria and request manager 740 does not provide the request to service provider 760 until the additional authentication criteria are met as described above, for example, implementation of a two-man rule.

When service provider 760 receives the request and user identifier, it fulfills the request as described above.

The various second factor authentication methods may have a hierarchy of security, and the requests are matched to a method in the hierarchy to determine the specific second factor method to use. It isn't necessary to make a determination of which second factor to use for a given request, as the processing of the request may implicitly include a predetermined method of implementing the second authentication factor.

Other Embodiments

Figure 8:
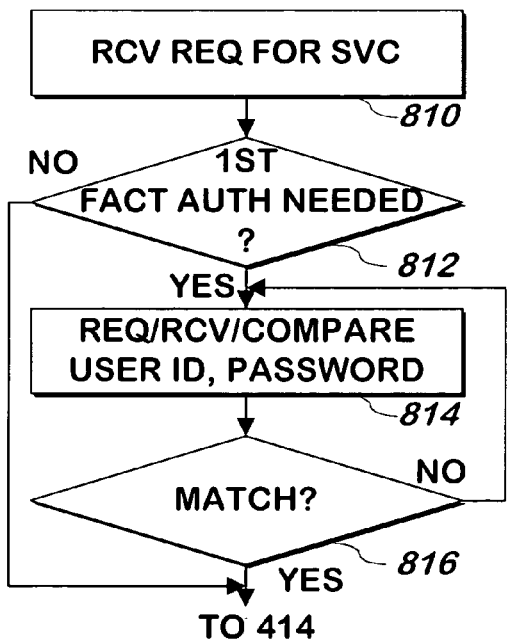
FIG. 8 is a flowchart illustrating a method of receiving a request and responding to it according to one embodiment of the present invention.

It isn't necessary that the first factor authentication for a user be repeated during the same session. In one embodiment, steps 410 and 412 of FIG. 4B are replaced by steps 810-816 of FIG. 8. Referring now to FIG. 8, a method of receiving a request and responding to it is shown according to one embodiment of the present invention. The request is received 810 and if the user has already successfully performed the first factor authentication during the session in which the request was received, or if the user has already performed the first factor authentication in that session and the request is a type of request for which first factor authentication need not be repeated during a session, or the request is of a type for which no first factor authentication is required, no first factor authentication is needed 812 and the method continues at step 414. Otherwise 812, the user is prompted 814 for his or her username and password (with customization information optionally displayed before prompting for the password as described above) and if the password matches 816 the password previously stored for the user identifier, the method continues at step 414 and otherwise 816, the method continues at step 814. In the system of FIG. 7, this technique may be implemented by request manager 740 not signaling first authentication manager 742 upon receipt of the request, if the user has already been authenticated in a session, or if the user has been so authenticated, provided the request is of a type that does not require reauthentication using the first factor method or if the request does not require a first factor authentication.

In one embodiment, multiple second factor authentication methods may be specified in step 414 and step 472 may include jumping to step 416 to perform any of the other specified second factor authentication methods. In the system of FIG. 7, this technique may be implemented by the substitution of multiple second authentication factors for the one described above, and second authentication manager 750 performs them one at a time, until all have been performed successfully or one has failed (or failed after a threshold number of retries). If any fails, second authentication manager 750 acts as if it was the only one in the description of FIG. 7 above, and if all succeed, second authentication manager 750 acts as if the one it performed in the description of FIG. 7 above succeeded.

In one embodiment, one of the second factor authentication methods not only authenticates the user, but authenticates some or all of the details of the request for service. Such an embodiment may be used where the details of the transaction could have been intercepted and changed, for example by a merchant, when the request to debit the account of a user is being made to a financial institution by an on-line merchant on behalf of, and as a result of a transaction initiated by, the user. For example, if the, or one of the, second authentication factor methods specified in step 414 is to verify the request 422, the user is requested to verify the request by providing the user with some or all of the details of the request (e.g. an amount being charged) using an out-of-band method, such as e-mail, a chat message, or the method shown in FIG. 9, and receiving a response such as an assent or a password, which may or may not be displayed after customization information for the user is displayed.

Figure 9:
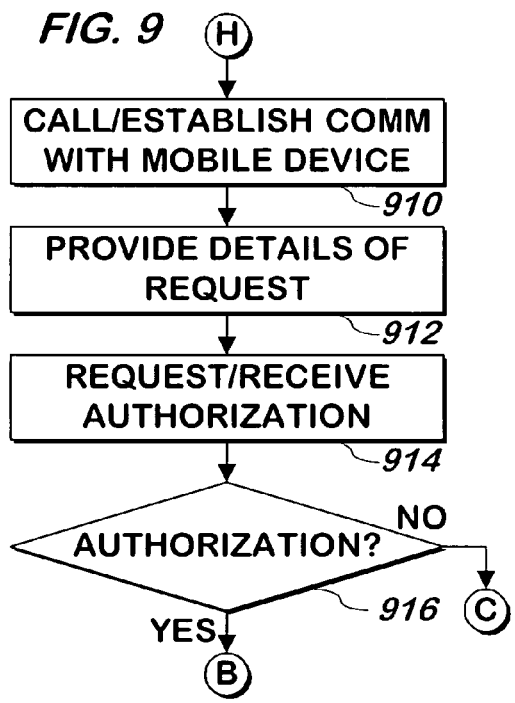
FIG. 9 is a flowchart illustrating a method of authenticating the user and the request according to one embodiment of the present invention.

Referring now to FIG. 9, a method of authenticating the user and the request is shown according to one embodiment of the present invention. The request may include any transaction or any other request, and the request need not come directly from the user. The user's mobile device is called or communications with the user's mobile device are otherwise established 910. Some or all of the details of the request are provided, such as via a text message or by speaking the details via conventional text to speech techniques 912. The user is requested to authorize the transaction, either by voice, a yes/no response, or by inputting a password, and an attempt at such authorization may be made by the user 914. If the attempt is successful, for example, because the user input or spoke a password associated with the user identifier, or the user spoke the password which was also authenticated via voice recognition, or the user simply indicated assent to the request 916, the method continues at step 470 and otherwise 916, the method continues at step 448. The method of FIG. 9 may be performed by second authentication manager 750 as another of the second authentication factors it performs as described above.

In one embodiment, two or more factors are used to authenticate a user. Other embodiments use one or more factors or three or more factors.

What is claimed is:

1. A method for authenticating a user by a system based on a plurality of authentication factors, the method comprising the steps of:
   receiving by the system a first authentication factor from a first communication device of the user, the first authentication factor comprising a password;
   receiving by the system a second authentication factor, the second authentication factor comprising data transmitted to or received from a second communication device of the user; and
   authenticating the user based on at least the received plurality of authentication factors;
   wherein the second authentication factor comprises at least one of:
     data transmitted by the system to the first communication device of the user and received by the system from the second communication device of the user; and
     data transmitted by the system to the second communication device of the user and received by the system from the first communication device of the user.

2. The method of claim 1, wherein the second authentication factor comprises data transmitted by the system to the first communication device of the user and received by the system from the second communication device of the user.

3. The method of claim 1, wherein the second authentication factor comprises data transmitted by the system to the second communication device of the user and received by the system from the first communication device of the user.

4. The method of claim 1, wherein the second authentication factor comprises data transmitted in a text message to the second communication device of the user.

5. The method of claim 1, wherein the second authentication factor comprises data received in a text message from the second communication device of the user.

6. The method of claim 1, wherein the second authentication factor comprises data transmitted in a voice message to the second communication device of the user.

7. The method of claim 1, wherein the second authentication factor comprises data received in a voice message from the second communication device of the user.

8. The method of claim 1, wherein the data comprises a uniform resource locator.

9. The method of claim 2, wherein the second authentication factor comprises data output to the user by the first communication device of the user and input by the user into the second communication device of the user.

10. The method of claim 3, wherein the second authentication factor comprises data output to the user by the second communication device of the user and input by the user into the first communication device of the user.

11. The method of claim 8, wherein the uniform resource locator is uniquely associated with the user.

12. The method of claim 7, further comprising the step of obtaining a third authentication factor by performing voice recognition on the voice message.

13. The method of claim 1, wherein the second authentication factor comprises a generated shared secret.

14. A method for authenticating a user based on a plurality of authentication factors, the method comprising the steps of:
   receiving a first authentication factor from a first communication device of the user, the first authentication factor comprising a password;

receiving a second authentication factor from the user, the second authentication factor comprising a device identifier of the first communication device of the user; and authenticating the user based on at least the received plurality of authentication factors;

wherein the step of receiving a second authentication factor from the user comprises the steps of:

determining whether the first communication device has a device identifier stored therein;

if the first communication device has a device identifier stored therein, receiving the device identifier of the first communication device; and if the first communication device does not have a device identifier stored therein:

transmitting data to the second communication device of the user, and receiving back the data transmitted to the second communication device of the user.

15. The method of claim 14, wherein at least a portion of the device identifier is stored on the first communication device of the user as at least one of a secure cookie or a Flash shared object.

16. The method of claim 15, wherein the stored portion of the device identifier is modified upon each authentication of the user.

17. An apparatus for authenticating a user based on a plurality of authentication factors, the apparatus comprising:

a memory; and a processor coupled to the memory and operative to control the apparatus:

to receive a first authentication factor from a first communication device of the user, the first authentication factor comprising a password;

to receive a second authentication factor, the second authentication factor comprising data transmitted to or received from a second communication device of the user; and to authenticate the user based on at least the received plurality of authentication factors;

wherein the second authentication factor comprises at least one of:

data transmitted by the system to the first communication device of the user and received by the system from the second communication device of the user; and data transmitted by the system to the second communication device of the user and received by the system from the first communication device of the user.

18. The apparatus of claim 17, wherein said apparatus comprises a web server.

19. The apparatus of claim 17, wherein the second authentication factor comprises data transmitted to the first communication device of the user and received from the second communication device of the user.

20. The apparatus of claim 17, wherein the second authentication factor comprises data transmitted to the second communication device of the user and received from the first communication device of the user.

* * * * *

UNITED STATES PATENT AND TRADEMARK OFFICE
CERTIFICATE OF CORRECTION

PATENT NO. : 8,751,801 B2
APPLICATION NO. : 11/112938
DATED : June 10, 2014
INVENTOR(S) : W. H. Harris et al.

It is certified that error appears in the above-identified patent and that said Letters Patent is hereby corrected as shown below:

On the Title page:

In (73), please change "EMC Corporation, Hopkinton, WA (US)" to --EMC Corporation, Hopkinton, MA (US)--

In the Specification:

In the detailed description of the invention:

Column 16, line 19, please change "id 422" to --ID 422--

Signed and Sealed this
Thirtieth Day of September, 2014

Michelle K. Lee
*Deputy Director of the United States Patent and Trademark Office*